United States Patent [19]

Lund

[11] 3,869,546

[45] Mar. 4, 1975

[54] ADJUVANT COMPOSITIONS AND MEDICINAL MIXTURES COMPRISING THEM

[75] Inventor: Lloyd J. Lund, Moraga, Calif.

[73] Assignee: Cutter Laboratories, Inc., Berkeley, Calif.

[22] Filed: Dec. 22, 1972

[21] Appl. No.: 317,752

[52] U.S. Cl. .................. 424/88, 424/81, 424/89, 424/91, 424/92
[51] Int. Cl. ............................................ A61k 27/00
[58] Field of Search ...................................... 424/88

[56] References Cited
UNITED STATES PATENTS
3,178,350  4/1965  Lund ................................... 424/89
3,469,003  9/1969  Hardy .................................. 424/89
3,639,577  2/1972  Urton et al. ......................... 424/92

Primary Examiner—Shep K. Rose
Attorney, Agent, or Firm—Millen, Raptes & White

[57] ABSTRACT

Acrylic acid polymer adjuvant compositions comprising a mixture of an acrylic acid polymer crosslinked with a polyallylsaccharide and a physiologically acceptable electrolyte have properties which greatly enhance the ease with which they may be formulated with active agents in the production of therapeutic mixtures of the adjuvant composition and active agent. Solutions of the therapeutic mixture have viscosities which are lowered to the point where they can be utilized commercially in a practical manner, while at the same time retaining the favorable adjuvant effects.

6 Claims, No Drawings

ADJUVANT COMPOSITIONS AND MEDICINAL MIXTURES COMPRISING THEM

BACKGROUND OF THE INVENTION

This invention relates to adjuvants, more specifically to adjuvant compositions comprising an acrylic acid polymer cross-linked with polyallylsucrose or polyallylpentaerythritol and to medicinal compositions comprising such adjuvants.

It is well established that the therapeutic effect of medicinal agents when administered subcutaneously or intramuscularly can be prolonged or enhanced by incorporating adjuvants with the medicinal agent. For example, antibody titers can be significantly enhanced in a host when an antigen is injected which has associated with it a substance which delays the release and distribution of the antigen throughout the tissues of the host. Substances such as mineral oil and aluminum hydroxide produce this adjuvant effect. They serve several functions; namely, they adsorb the medicinal agent, as for example, an antigenic substance, and prevent rapid distribution of the antigen into surrounding tissues. Being relatively insoluble and non-metabolizable, they keep the antigen more or less localized at the site of injection so that the antigen is not quickly dispersed, thus giving the lymphocytes of the host an opportunity to generate antibodies. They also act as an irritant which promotes the routing of lymphocytes to the irritated site thus bringing the antibody producers in contact with the antigen. Such adjuvants, however, are not too satisfactory since they generally promote the formation of sterile abcesses and mineral oils may be implicated in the formation of tumors.

In U.S. Pat. Re. No. 26,963, reconstituted collagen is disclosed as a non-toxic adjuvant. It is stated that the collagen in the active agentcollagen combination, after injection, gels to a solid mass and retains the active agent in the injection site, a condition which favors retardation of the release of the active agent and hence allows the effect of the active agent to be maintained for a prolonged period of time. Furthermore, the observation is made that, at a given pH, the collagen may be dispersed in direct proportion to the amount of sodium chloride added to it. The life of this adjuvant, hence its period of effectiveness, is decreased by the inclusion of sodium chloride.

The use of a polymer of acrylic acid cross-linked with various polyol compounds as an adjuvant is described in U.S. Pat. No. 3,178,350. Such polymers are commercially available under the trademark "Carbopol." Carbopol 934, for example, is the polymer where the cross-linking agent is polyallylsucrose. Carbopol 941 is a lower molecular weight member of the class of Carbopols. These polymers form aqueous gels whose viscosity increases with increased pH or increased concentration of the Carbopol. According to the disclosure in U.S. Pat. No. 3,178,350, mixtures of Carbopol 934 or Carbopol 941 with various virus vaccines at about neutral pH, resulted in greatly enhanced antibody production in the host when the Carbopols were in the range of 0.25 to 0.50 per cent of the mixture. Unneutralized Carbopol was considerably less effective an adjuvant, probably because the antigen is destroyed at the low pH of the acidic Carbopol. It is belived that Carbopol behaves in a manner similar to other gels such as collagen and aluminum hydroxide; namely, the active agent is adsorbed on the polymer and the combination is retained at the injection site. The polymer is only slowly dispersed and the active agent is retained at the site for prolonged slow release.

Carbopol in its neutralized states, however, forms very viscous solutions or gels in the range of 0.25 to 0.50 per cent after mixing with an active agent and is still too viscous to draw into and dispense from a hypodermic syringe with ease. Furthermore, the viscous nature of the material at these concentrations makes it very difficult to blend or mix uniformly with an active agent which is in a dry state or in an aqueous solution, particularly in production scale.

The excellent adjuvant properties of the Carbopol cross-linked acrylic acid polymers would be most desirable if the high viscosity of useful ranges did not render it impracticable in formulation and dispensing operations.

It is a primary objective of this invention to provide effective adjuvant solutions of certain acrylic acid polymers while at the same time controlling the viscosity thereof to permit them to be readily mixed with an active agent and easily injected into a host.

A further object is to provide concentrated solutions of such polymers which may be easily mixed with solutions of active agents to give effective adjuvant mixtures without materially lowering the concentration of the active agent.

SUMMARY OF THE INVENTION

The compositions of this invention are adjuvant mixtures of a substantially neutral injectable acrylic acid polymer cross-linked with polyallylsucrose or polyallylpentaerythritol capable of exerting an adjuvant effect in vertebrates in admixture with an amount of a physiologically acceptable electrolyte effective to lower substantially the viscosity of aqueous solutions of the polymers, and antigen-adjuvant biologics comprising them.

DETAILED DISCUSSION

The viscosity of Carbopol type cross-linked acrylic acid polymer solutions can be reduced in accordance to this invention to a level which allows the solutions to be readily mixed with solid or solution forms of biologically active agents and allows the mixture to be easily dispensed through a hypodermic needle, by admixing an electrolyte with the polymer. It is known that an electrolyte, such as sodium chloride, increases the dispersibility of a collagen adjuvant. However, this increased dispersion, resulting from a decrease in viscosity, leads to a decrease in the adjuvant effect. It is also known that electrolytes will decrease the viscosity of Carbopol gels or solutions. On the basis of the detrimental effect that sodium chloride has on collagen, it would be expected that Carbopol would likewise become less effective as an adjuvant in the presence of an electrolyte. Therefore, it was of considerable surprise to discover that even though a solution of Carbopol whose viscosity had been greatly lowered by the inclusion of an electrolyte, this solution could be mixed with an active agent, an antigen for example, and the adjuvant effect of the polymer is retained.

The adjuvant of this invention comprises an aqueous solution of a polymer as defined herein and a physiologically acceptable electrolyte, in a molar weight proportion of about 1 of the polymer (assuming a minimum molecular weight of about 200,000) to about 800 to 8,000 of the electrolyte. The adjuvant solution should preferably be about neutral, that is, in the pH range of 6.0–8.0 to avoid destruction of active agents which may be mixed with the adjuvant solution. Many active agents, antigens for example, are degraded in acidic or basic media.

The polymers employed as adjuvants include the class of colloidally water-soluble acrylic acid polymers cross-linked with polyhydroxy compounds in which the hydrogen atoms of at least some of the hydroxy groups have been replaced by unsaturated aliphatic groups, e.g., polymers of acrylic acid cross-linked with from 0.75 to 2.00 percent of polyallysucrose and polyallyl-pentaerythritol, as described in U.S. Pat. No. 3,178,350. Typical of these compounds are those made by the B. F. Goodrich Chemical Company and designated by the trademark Carbopol. Carbopol—934 is the acrylic acid polymer cross-linked with approximately 1 percent polyallylsucrose. Carbopol—934 is the preferred adjuvant compound although other Carbopols such as Carbopol—940 and Carbopol—941 are also acceptable. The concentration of the polymer in the adjuvant solution can vary from about 0.10 per cent to about 3 per cent or more. The higher concentrated solutions are of particular advantage for mixing with solutions of an active agent, for example bacterins, which cannot be diluted appreciably without lowering the potency of these bacterins to levels unacceptable to the U.S. government regulatory agencies. Higher concentrations of the polymer can be diluted by mixing with a volume of a solution of an active agent which brings the concentration of polymer in the resulting adjuvant-active agent mixture to a lower level which is sufficient to produce an adjuvant effect. The final concentrations of the polymer in the mixture with the active agent should be at least 0.10 percent and can be as high as about 1.0 percent, preferably in the range of about 0.20 to about 0.50 percent. If the active agent is in dry form, it is merely dissolved or suspended in the polymer solution of a concentration known to give good adjuvant effects, usually about 0.2 to 0.5 percent or more.

Solutions of the polymer in a pH range of 6–8 are very viscous even at a concentration of around 0.25 percent and at about 0.5 percent or higher they form gels. It becomes almost physically impossible to mix an active agent into gels containing 0.5 percent or higher of polymer and achieve a homogeneous mixture, particularly on a production scale. Mixtures of an active agent and the polymer in which the concentration of the polymer is about 0.25 to 0.50 percent are generally too viscous to draw into or expel easily through a needle of a hypodermic syringe.

These drawbacks for using an otherwise effective polymer adjuvant are overcome by the incorporation with the polymer an amount of electrolyte sufficient to reduce the viscosity of the polymer solution to useful levels, e.g., about 500 to 50,000 cps, preferably about 500 to about 40,000 cps. The amount of electrolyte which should be added will generally be dictated by the initial viscosity of the polymer at the intended concentration in the active agent-adjuvant solution. The amount of electrolyte generally should not greatly exceed isotonicity in the final adjuvant-active agent mixture. Usually lesser quantities will be required to bring the viscosity of the mixture down to a useful level. Any physiologically acceptable electrolyte may be used, as long as it is physiologically acceptable and thus not detrimental to the host. Examples are alkali-metal, alkaline earth and ammonium salts of mineral and organic acids, e.g., sodium chloride and bromide; potassium chloride and bromide; ammonium, magnesium and calcium chloride; sodium, potassium, ammonium and magnesium sulfate; sodium and potassium mono-, di-, and tribasic phosphates; sodium and potassium acetates, sodium and potassium propionates; sodium and potassium succinates; sodium and potassium maleates; sodium and potassium tartrates; sodium and potassium lactates; ammonium, sodium and potassium citrates; sodium, potassium and magnesium gluconates; and sodium ascorbate. Of these, sodium phosphates, sodium chloride, sodium citrate and magnesium sulfate are preferred. In some instances the active agent itself may be ionic and will effect a lowering of viscosity. Nevertheless, sufficient electrolyte should be incorporated in the polymer adjuvant solution to lower its viscosity to a level which will allow the solution to be mixed relatively easily with the active agent.

The viscosity of the polymer-electrolyte adjuvant solution, prior to mixing with the active agent, regardless of whether the active agent is in the dry form or in a solution or suspension, should not be greater than about 50,000 cps as measured in the following manner: Approximately 400 ml. of the adjuvant solution is placed in a 600 ml. beaker and a No. 7 spindle is placed into the solution and rotated at 10 rpm while recording the reading on a Brookfield viscometer, model RVT at 25°C±0.5°C. To achieve a viscosity of about 50,000 cps or lower, for ease in mixing the adjuvant solutions with solutions or suspensions of an active agent, particularly when higher polymer concentrations are involved, an electrolyte is mixed with the polymer or aqueous solution thereof in an amount which will lower the viscosity of the adjuvant solution to 50,000 cps or less, preferably about 500–40,000 cps, more preferably about 500–32,000cps. For ease in passing through hypodermic needles, the final viscosity of the solution of the mixture adjuvant and active agent should generally be about several hundred to a few thousand centipoise.

In U.S. Pat. No. 3,178,350, there is disclosed an adjuvant solution containing only Carbopol. Good adjuvant properties were obtained using Carbopol at 0.25 and 0.50 percent. The viscosities of these solutions at pH 7 were 12,000 and 60,000 cps, respectively using a No. 7 spindle and a speed of 10 rpm. Although it required some effort, particularly with the 0.5 percent solution, they were finally mixed with dried influenza vaccine, for example, and the mixtures could be made to pass through a 20 gauge needle but only with difficulty. For example, with the 0.25 percent solution, it requires approximately 40 seconds to draw 5 ml. into a syringe and about 15 seconds to expel the 5 ml. The 0.5 percent gel could not be drawn through the needle. If 5 ml. was placed into a syringe, it required about 20 seconds and considerable pressure to expel the contents through the needle. After adding sodium phosphates to similar solutions in amounts to make them about half isotonic, the viscosities were 400 cps and 600 cps, respectively. These solutions could be readily mixed with dried vaccine and made to pass through 20 gauge needles with ease and rapidity. The adjuvant effect did not diminish, even though the viscosity had been greatly decreased.

The term "active agent" as used herebefore is meant to include therapeutic agents of many types whose effect may be prolonged or enhanced by their inclusion with the adjuvant polymers. Among these are antigenic substances which stimulate the production of antibodies and include viruses such as influenza (monovalent or polyvalent, human or equine), measles, mumps, poliomyelitis, canine distemper, encephalomyelitis, rabies, foot mouth disease, bovine diahrrea, infectious bovine rhinotracheaitis and Newcastle disease viruses; toxoids, such as those of *Clostridium perfringens* (Types B, C, and D), *Clostridium tetani*, and diphtheria; bacterins, such as those of *Clostridium chauvoei*, *Clostridium septicum*, *Clostridium hemolyticum*, *Clostridium novyi*, *Clostridium sordellii*, Leptospira, streptococcus, staphlococcus, pneumococcus, pseudomonas, *H. pertussis*, fowl cholera, and erysipelas; rickettsia, such as rocky mountain spotted fever, typhus, Q fever; allergens, such as pollens, dust, danders or extract of same; and venoms, such as bee sting and snake venoms; and the like.

The adjuvant solutions may be prepared by several procedures. In one method, the electrolyte and polymer are intimately blended in the dry state, then added gradually to water, preferably warmed to about 50° to 70°C., while stirring at about 1–2000 rpm. Following dissolution of the mixture, the pH is adjusted to the desired value, somewhere in the range of 6–8, preferably about 6.5–7.5, by the addition of an aqueous solution of a base such as sodium hydroxide or ammonium hydroxide. Additional water is added to bring the polymer to the desired final concentration and the solution may then be sterilized by conventional means. The adjuvant solution may also be prepared by blending an electrolyte with a polymer which has been neutralized with a base such as sodium or ammonium hydroxide and isolated in a solid state. The blend is readily dissolved in the appropriate amount of water. The preblending of the polymer and electrolyte greatly facilitates the dissolution of the polymer since high viscosities are not encountered as would be the case when polymer is first dissolved and then the electrolyte is added.

Solutions or suspensions of the adjuvant solution in combination with an active agent may then be prepared. In those cases where the active agent is added as a solid, the concentration of the polymer in the adjuvant solution will generally be in a lower range, most usually about 0.2 to 0.5 percent, so that the final concentration of the polymer in the adjuvant-active agent mixture will be the same as in the adjuvant solution. When the adjuvant solution is to be mixed with an active agent which is in the form of a solution or suspension, such as soluble bacterin or virus vaccine solutions, then the concentration of the polymer in the adjuvant solution will usually be much greater, generally, in the range of about 0.5 to 3 percent or higher, so that the resulting mixture of one volume of the adjuvant solution with one to ten or more volumes of vaccine solution, for example, will contain the adjuvant polymer at a lower but still very effective level. In effect, the potency of the vaccines are not materially reduced by this dilution with the polymer adjuvant solution. This is very important when one is dealing with vaccines whose potencies are borderline and which would be impossible or commercially impracticable or detrimental to concentrate by means such as ultrafiltration or dialysis. An alternative to mixing very concentrated solutions of polymer adjuvant with vaccines with borderline potencies is to dissolve a blend of neutralized polymer and electrolyte directly into the vaccine solution. Generally, however, it is more convenient and reliable in large production batches to mix the polymer as a solution with the vaccine solution.

Although not necessary or essential for the adjuvant effects of the polymer in the polymer-electrolyte solution, other materials may be included. For example, various physiologically acceptable emulsifiers may be added to the water to speed up the dissolution of the polymer when preparing the adjuvant solution. The emulsifier may be a non-ionic compound, such as Tween 80 (polyoxyethylene sorbitan monooleate), Span 20 (sorbitan monolaurate) or others of this type, alone or in combinations or mixed with vegetable oils. The emulsifier, when used, generally does not exceed about 0.05 percent in the final adjuvant-active agent mixture. The inclusion of buffers is sometimes desirable for maintaining pH stability of the adjuvant solution. Alkali metal phosphates, such as monosodium and disodium phosphates are preferable. They not only serve as a buffer but being electrolytes also contribute to the lowering of viscosity of the polymer solution. Phosphates may be used in combination with other electrolytes such as sodium chloride, the phosphate acting as a buffer and both effecting a lowering of viscosity. Non-toxic materials such as gelatin and collagen, may also be incorporated into the adjuvant solution. Their presence appears to provide a more elegant appearance to the solution. Although concentration may vary, a preferred concentration appears to be about 1% in the adjuvant-active agent mixture. Preferred adjuvant-active agent compositions of this invention are those adapted for intramuscular (I.M.), intraperitoneal (I.P.) and/or subcutaneous (SQ) administration.

The invention thus relates to improved adjuvant solutions and to injectable mixtures thereof containing biologics. The adjuvant solutions comprise about 0.10 to about 3.0 percent of a substantially neutral, colloidally water-soluble acrylic acid polymer cross-linked with a polyalkylsucrose or polyallylpentaerythritol and a physiologically acceptable electrolyte. The electrolyte is present in an amount which will at least lower the viscosity of the adjuvant solution within the range of about 500 to about 50,000 cps depending upon the relative concentration of the polymer. The electrolyte concentration may be as high as that which produces isotonicity in the final injectable solution of the mixture of the adjuvant solution and the biologic. The injectable composition resulting from mixing the adjuvant solution and the biologic should contain between 0.1 and 1.0 percent of the polymer, preferably about 0.2 to 0.5 percent. The injectable composition should contain an amount of electrolyte relative to the polymer concentration which produces a viscosity from about 200 to about 10,000 cps, preferably about 200 to 2,000 cps. Thus, for example, a solution containing 0.5 percent of the polymer would have a viscosity of about 60,000 cps and would be too viscous to mix conveniently with a biologic solution. If sodium phosphate is added to this solution to give a concentration of 1.4 percent (about isotonic), the viscosity of the resulting solution drops to about 600 cps and this solution can be readily mixed with a biologic. A 50:50 mixture of this adjuvant solution and a biologic solution would produce an injectable composition containing 0.25 percent of the polymer and 0.7 percent of the phosphate electrolyte (about one-half isotonic) and having a viscosity of about 400 cps. If, for example, the adjuvant solution contains 2.5 percent of the polymer and no electrolyte, the viscosity is about 166,000 cps and the adjuvant could not be mixed with a biologic. With the addition of phosphate to make a concentration of 7.0 percent in the adjuvant solution, the viscosity drops to about 48,000. This solution has a low enough viscosity that it can be mixed with a solution of a biologic. Mixing nine parts of a biologic solution with one part of this adjuvant solution results in a final concentration of 0.25 percent of the polymer and 0.7 percent of the phosphate. The viscosity of the final mixture is about 400 cps, well below what is acceptable for ease in injecting and adjuvanted biologic solution.

In order to more clearly disclose the nature of the present invention, specific examples illustrating typical compositions of the adjuvant solutions and combination with specific active agent are hereinafter described.

ADJUVANT SOLUTIONS OF CARBOPOL

All weights are expressed in grams of Carbopol or electrolyte in 100 ml. of solution. pH was adjusted with 20% NaOH.

equal volume of a 2.2 percent $Al(OH)_3$ suspension.

C. Same as A. but replacing the phosphate buffer with an equal volume of the Carbopol-sodium phosphate electrolyte adjuvant solution of Example 5.

D. Dried human influenza vaccine (PR—8) mixed with the Carbopol solution of Example 2 which contained no electrolyte.

Test 1. Three groups of 24 Swiss Webster mice were inoculated subcutaneously with 0.5 ml. of either vaccine preparation A, B, or C. Fourteen days later 12 mice from each group were bled, the sera were pooled and the remaining 12 mice in each group were given a second 0.5 ml. inoculation. Pooled sera from the second group of 12 were collected after 14 days. A fourth group of 24 mice were given only one 0.5 ml. dose of the C vaccine preparation; serum was collected from 12 mice on the 14th day and on the 28th day. Antibody titers were obtained on the pooled sera by the standard hemaglutination inhibition test (HAI).

Test 2. A group of 8 rats was inoculated subcutaneously with 0.5 ml. of the D vaccine preparation, serum was collected on the 14th day, and analyzed by the HAI test.

| | | | | Viscosity at 25° ± 0.5°C. | | | | |
|---|---|---|---|---|---|---|---|---|
| Example | Carbopol[1] 934P | Electrolyte | pH | Spindle | RPM | Scale 1–100 Reading | x Factor | = cps |
| 1 | 0.25 | none | 6.8 | 7 | 10 | 3 | 4000 | 12,000 |
| 2 | 0.5 | none | 6.8 | 7 | 10 | 15 | 4000 | 60,000 |
| 3 | 2.5 | none | 6.65 | 7 | 10 | 41.5 | 4000 | 166,000 |
| 4 | 0.25 | 0.47 $Na_2HPO_4$<br>0.23 $NaH_2PO_4.H_2O$ | 6.9 | 7 | 100 | 1 | 400 | 400 |
| 5[2] | 0.5 | 0.94 $Na_2HPO_4$<br>0.46 $NaH_2PO_4.H_2O$ | 6.9 | 7 | 10 | 1.5 | 400 | 600 |
| 6 | 2.5 | 4.7 $Na_2HPO_4$<br>2.3 $NaH_2PO_4.H_2O$ | 6.95 | 7 | 10 | 12 | 4000 | 48,000 |
| 7 | 2.5 | 9.4 $Na_2HPO_4$<br>4.6 $NaH_2PO_4.H_2O$ | 7.0 | 7 | 10 | 8 | 4000 | 32,000 |
| 8 | 2.5 | 2.5 NaCl | 7.0 | 7 | 10 | 10 | 4000 | 40,000 |
| 9 | 2.5 | 5.0 NaCl | 6.60 | 7 | 10 | 4.5 | 4000 | 18,000 |
| 10 | 2.5 | 1.2 $MgSO_4$ | 7.0 | 7 | 10 | 8 | 4000 | 32,000 |
| 11 | 2.5 | 5.0 Na citrate (dihydrate) | 6.5 | 7 | 10 | 13.5 | 4000 | 54,000 |
| 12 | 2.5 | 10.0 Na citrate (dihydrate) | 6.7 | 7 | 10 | 6.5 | 4000 | 26,000 |
| | Carbopol 940 | | | | | | | |
| 13 | 2.5 | 5.0 NaCl | 6.9 | 7 | 10 | 10 | 4000 | 40,000 |
| | Carbopol 941 | | | | | | | |
| 14 | 2.5 | 2.5 NaCl | 6.8 | 7 | 10 | 7.5 | 4000 | 30,000 |

[1] P stands for pharmaceutical grade.
[2] Solution also contains equal parts Tween 80 and Span 20 (total 0.1 g.), 1 ml. cottonseed oil and 2.5 g. gelatin.

MIXTURES OF CARBOPOL ADJUVANT WITH ACTIVE AGENTS

Example 15

Influenza Virus

The following vaccine preparations were made:

A. Bivalent equine influenza vaccine solution containing formalin killed Strain $A_1$ (A/Equine 1/Pa./63 strain) and Strain $A_2$ (A/equine 2/Miami/63 strain) mixed with an equal volume of 1.4 percent sodium phosphate buffer (control vaccine, no adjuvant present).

B. Same as A. but replacing phosphate buffer with an

| | Vaccine Preparation | Days Post Inoculation | HAI Titer Against Strain $A_1$ | HAI Titer Against Strain $A_2$ |
|---|---|---|---|---|
| A | (Control — no adjuvant) (2 inoculations) | 14<br>28 | 128<br>128 | 2<br>16 |
| B | ($Al(OH)_3$ adjuvant) (2 inoculations) | 14<br>28 | 128<br>256 | 2<br>16 |
| C | (Carbopol adjuvant — with electrolyte) (2 inoculations) | 14<br>28 | 256 | 2<br>64 |
| | | | ≤ 512 | |
| C | (Carbopol adjuvant — with electrolyte) | 14 | 256 | 32 |

-Continued

| Vaccine Preparation | Days Post Inoculation | HAI Titer Against | |
|---|---|---|---|
| | | Strain $A_1$ | Strain $A_2$ |
| (1 inoculation) | 28 | 512 | 128 |
| D (Carbopol adjuvant — no electrolyte) (1 inoculation) | 14 | Strain A 256 | |

These results show the adjuvant effect of Carbopol to be superior to that of $Al(OH)_3$ with respect to influenza virus vaccines and demonstrate that the adjuvant effect of Carbopol is not diminished even though the viscosity of the Carbopol vaccine mixture has been decreased by the inclusion of the phosphate electrolyte.

Example 16
Equine Influenza Virus

Horses were inoculated intramuscularly with 1.0 ml. of a 50-50 mixture of the bivalent equine influenza (Strains $A_1$ and $A_2$) vaccine solution and the Carbopol-phosphate electrolyte adjuvant of Example 5. Serum samples were obtained on days 0, 21, 41 and 63. All horses showed slight to moderate pre-existing antibody levels due to previous infections with the viruses. Earlier studies on two groups of 13 horses had demonstrated little or no antibody response to either strain could be elicited up to 63 days following injection of the same virus in phosphate buffer and in $Al(OH)_3$.

| Horse | Days Post Inoculation | HAI Titers Against | |
|---|---|---|---|
| | | Strain $A_1$ | Strain $A_2$ |
| 1 | 0 | 64 | 4 |
| | 21 | 1024 | 64 |
| | 41 | 1024 | 32 |
| | 63 | 2048 | 256 |
| 2 | 0 | 32 | <4 |
| | 21 | 512 | 16 |
| | 41 | 512 | 32 |
| | 63 | 1024 | 128 |
| 3 | 0 | 256 | 16 |
| | 21 | 1024 | 128 |
| | 41 | 512 | 128 |
| | 63 | 2048 | 256 |
| 4 | 0 | 128 | 4 |
| | 21 | 256 | 128 |
| | 41 | 256 | 128 |
| | 63 | 512 | 128 |
| 5 | 0 | 16 | <4 |
| | 21 | 128 | 64 |
| | 41 | 64 | 64 |
| | 63 | 512 | 64 |
| 6 | 0 | 128 | 4 |
| | 21 | 512 | 64 |
| | 41 | 1024 | 64 |
| | 63 | 2048 | 64 |
| 7 | 0 | 64 | <4 |
| | 21 | 512 | 128 |
| | 41 | 1024 | 128 |
| | 63 | 2048 | 256 |

These results from testing on another species further confirm the good adjuvant properties of a Carbopol-electrolyte mixture with a vaccine.

Example 17
Clostridium chauvoei Bacterin

Strains Nos. 5686, 5677, 5677-2, and 5987 of C. chauvoei were grown in beef broth and killed with formalin. Equal parts of the four whole cultures were combined for the vaccine. A portion was centrifuged, the supernatant fluid was reserved, and the paste of whole cells was washed and resuspended in isotonic phosphate saline buffer to the original volume before centrifugation. The following mixtures were then prepared:

A. 87 parts whole culture + 13 parts of 2.2 percent $Al(OH)_3$ suspension.

B. 87 parts supernatant fluid + 13 parts of 2.2 percent $Al(OH)_3$ suspension.

C. 87 parts resuspended cells + 13 parts of 2.2 percent $Al(OH)_3$ suspension.

D. 90 parts whole culture + 10 parts of the Carbopol-phosphate electrolyte adjuvant of Example 6.

E. 90 parts supernatant fluid + 10 parts of the Carbopol-phosphate electrolyte adjuvant of Example 6.

F. 90 parts resuspended cells + 10 parts of the Carbopol-phosphate electrolyte adjuvant of Example 6.

Six groups of 10 guinea pigs were injected subcutaneously with 0.5 ml. of one of the six vaccine-adjuvant preparations on day 0 and day 10. At day 21, all were challenged with C. chauvoei spore IRP128. Survivors were determined on day 24. This procedure is Standard Requirement B—23 SAM—200 of the U.S. Department of Agriculture, Vet. Biol. Division and 80% of the animals must survive in order for the vaccine to pass the test.

| Mixture | Survival |
|---|---|
| A | 8/10 |
| B | 7/10 |
| C | 6/10 |
| D | 10/10 |
| E | 10/10 |
| F | 10/10 |
| Controls (no bacterin) | 0/10 |

C. chauvoei vaccines containing no adjuvant seldom will pass potency test requirements since potencies of production lots which have not been concentrated by some means are generally borderline. Adjuvants are therefore most desirable for such vaccine preparations. The above experiment demonstrates how it is possible to take advantage of the good adjuvant properties of Carbopol without significantly lowering the potency per ml. of the bacterin. This is accomplished by adding only a very small volume of a very concentrated solution of the Carbopol to the bacterin solution. Mixing the bacterin solution with the concentrated Carbopol solution is possible only by virtue of the greatly reduced viscosity of the Carbopol solution resulting from the inclusion of the electrolyte. Without the electrolyte, the 2.5 percent Carbopol solution would exist as a stiff gel which could not possibly be mixed with the bacterin solution without a great deal of difficulty, require a prolonged period of time and render the operation commercially impracticable.

Example 18

Clostridium sordellii Toxoid

Strain 3822—2 of Clostridium sordellii was grown in beef broth and killed with formalin. The culture was centrifuged and the supernatant fluid was collected. Ninety parts of this fluid was mixed with 10 parts of the Carbopol-phosphate electrolyte adjuvant of Example 6. Ten mice were injected subcutaneously with 0.5 ml. of the mixture on days 0 and 14 and challenged on the 28th day with C. sordellii spore.

| Mixture | Survival |
|---|---|
| C. sordellii toxoid + Carbopol | 8/10 |

Example 19

Clostridium septicum with C. chauvoei Bacterin

Various mixtures of C. chauvoei and C. septicum were prepared as follows:

A. 2 parts C. chauvoei whole culture with 1 part C. septicum whole culture.

B. 1 part each of the two whole cultures plus the paste from centrifugation of 1 part chauvoei whole culture.

C. Paste from 1 part chauvoei and 1 part septicum whole culture.

D. Equal parts of the whole culture of each.

Nine parts of each mixture were then mixed with one part of the Carbopol-phosphate electrolyte adjuvant of Example 6. Groups of 5 hamsters and 10 guinea pigs were inoculated with 0.2 ml. of the bacterin-adjuvant mixtures on days 0 and 10. On the 21pr st day, the 10 guinea pigs were challenged with C. chauvoei spore and the 5 hamsters were challenged with C. septicum spore in each group. Control animals were challenged with one-tenth the spore concentration the test animals received.

| Bacterin-Adjuvant Mixture | Challenged with | Survival |
|---|---|---|
| A | C. chauvoei spore | 8/10 |
|   | C. septicum spore | 5/5 |
| B | C. chauvoei spore | 9/10 |
|   | C. septicum spore | 5/5 |
| C | C. chauvoei spore | 6/10 |
|   | C. septicum spore | 5/5 |
| D | C. chavuoei spore | 8/9 |
|   | C. septicum spore | 5/5 |
| Controls (no bacterin) | C. chauvoei spore | 0/10 |
|   | C. speticum spore | 0/5 |

Good adjuvant effects were demonstrated for Carbopol 934P with respect to C. septicum. Results from Examples 18 and 19 further show the advantages of being able to mix concentrated Carbopol solutions (because of the viscosity lowering effect of the electrolyte) with two other Clostridium bacterins whose potencies are normally borderline and obtain good adjuvant effects. Without adjuvant of any kind, vaccine preparations of C. sordellii or C. septicum seldom pass potency test requirements.

What is claimed is:

1. A biologic solution comprising an antigen which stimulates the production of antibodies and an adjuvant therefore consisting essentially of a colloidally water-soluble neutralized polymer of acrylic acid cross-linked with from 0.75 to 2.00 percent of polyallylsucrose or polyallylpentaerythritol, wherein the polymer is present at a concentration of at least about 0.2 percent and the biologic solution comprises a physiologically acceptable electrolyte at a concentration which is effective to lower substantially the viscosity imparted to the solution by the polymer to a maximum of 2,000 cps.

2. A biologic according to claim 1, wherein the adjuvant is present at a concentration of about 0.2 to 0.5 percent.

3. A biologic according to claim 1, wherein the adjuvant and the electrolyte are present at a concentration of about 0.25 percent and about 0.7 percent, respectively.

4. A biologic according to claim 1, wherein the electrolyte is sodium phosphate, sodium chloride, sodium citrate or magnesium sulfate.

5. A biologic according to claim 1, wherein the electrolyte is sodium phosphate.

6. A biologic according to claim 5, wherein the adjuvant and the electrolyte are present at a concentration of about 0.25 percent and about 0.7 percent, respectively.

* * * * *